July 14, 1925.
F. C. GRANT
PAD FOR AUTOMOBILE CLUTCH AND BRAKE PEDALS
Filed April 14, 1924
1,545,756
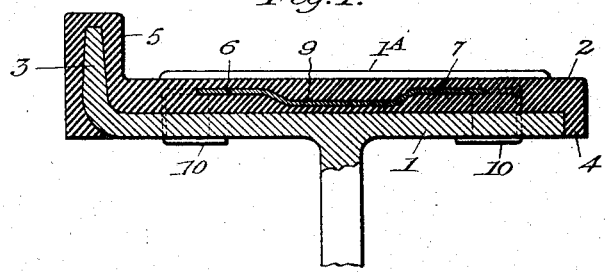
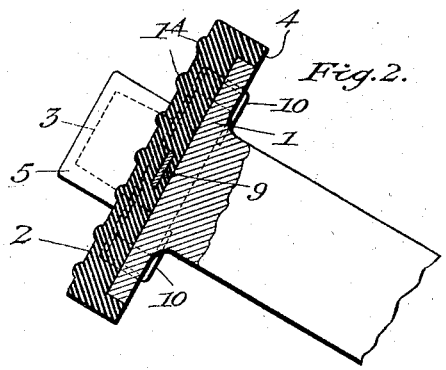
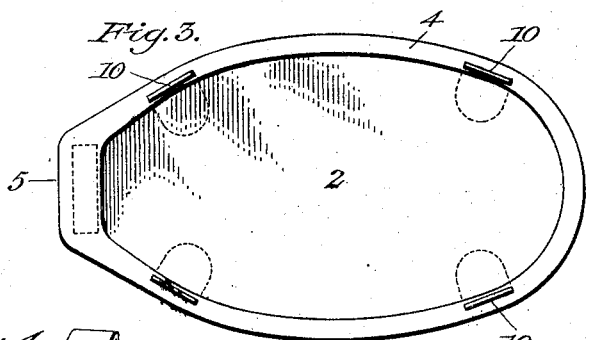
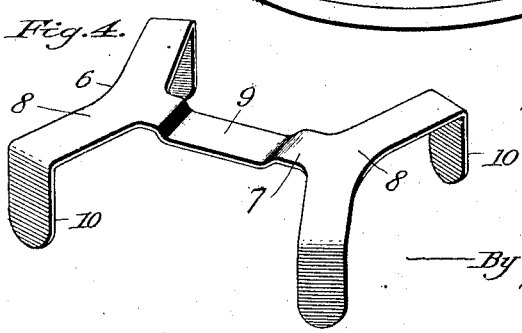
Inventor
Frederick C. Grant
By G. Sargent Elliott
Attorney

Patented July 14, 1925.

1,545,756

UNITED STATES PATENT OFFICE.

FREDERICK C. GRANT, OF CHICAGO, ILLINOIS.

PAD FOR AUTOMOBILE CLUTCH AND BRAKE PEDALS.

Application filed April 14, 1924. Serial No. 706,482.

*To all whom it may concern:*

Be it known that I, FREDERICK C. GRANT, a citizen of the United States of America, residing at Chicago, county of Cook, and State of Illinois, have invented a new and useful Pad for Automobile Clutch and Brake Pedals, of which the following is a specification.

This invention relates to improvements in pads for automobile clutch and brake pedals.

The object of the invention is to provide a resilient pad which conforms to the shape of the pedal, and which has embedded therein metal means whereby the pad can be easily and quickly attached to the pedal, or detrached therefrom.

Further, to provide a rubber pad of the size and shape of a pedal, having a depending lip which surrounds the edge of the pedal, and a hollow projection to receive the usual foot stop on the outer end of the pedal; said pad having a one-piece metal member embedded therein during the vulcanizing process, and which is provided with depending strips or fingers which are adapted to be bent around the edge of the pedal against its under side, thereby to securely fasten the pad to the pedal, the said pad being complete in itself and thus eliminating the employment of separate attaching means.

These objects are accomplished by the character of pad illustrated in the accompanying drawings in which:

Figure 1 is a longitudinal sectional view through the improved pad and a pedal to which it is secured.

Figure 2 is a transverse section of the same.

Figure 3 is a bottom view of the pad; and

Figure 4 is a perspective view of the metal pedal engaging member or fastener which is embedded in the pad.

Referring to the accompanying drawings:

The numeral 1 indicates one of the foot pedals of an automobile, and 2, the improved rubber pad which is secured thereon in a manner to be presently described. The pedal is of a style in common use, being of oval form in plan view and having an upwardly projecting foot stop 3 on its outer end.

The pad 2, is of the size and shape of the pedal, and is formed with raised longitudinal ribs 1ᴬ on its top face, and with a depending lip 4, which surrounds the edge of the pedal; the depth of this lip corresponding to the thickness of the pedal. The outer end of the pad is formed with a hollow upright projection 5, which is adapted to fit over the foot stop 3, so that the whole pedal is covered by the pad.

During the vulcanizing process by which the pad is formed, a metal fastener 6 is embedded in the pad, and thus becomes a fixed part of the same. This fastener comprises a longitudinal strip 7 formed with an integral transverse wing 8 on each end, the central portion 9 of the strip being pressed down to lie below the plane of the wings 8, as shown. The end portions 10 of each wing are bent down at right angles to the remaining portion of the wing, and in the finished pad, these end portions 10 extend down through and below the edge of the lip 4 of the pad, and form the fastening means proper. The ends 10 are bent on diagonal lines, as shown, so that their faces will lie flat against the curved edge of the pedal. By bending down or depressing the central portion 9 of the longitudinal strip 7, the fastener, when embedded in the pad is better anchored or supported therein, than would be the case if the strip were perfectly flat, as the wings, in the present arrangement, are more deeply embedded in the rubber, or on other words, a greater thickness of rubber is below the wings than above them, and a greater thickness of rubber is above the depressed portion 9 of the strip than below it, as clearly shown in Figure 1. In the finished pad, as supplied to the trade, the ends 10 depend vertically below the lip 4 of the pad, and the pad is thus ready to be secured upon the pedal.

In practice, the pad is placed upon the pedal, the foot stop 3 of which is inserted in the hollow projection 5 of the said pad, and when so placed, the lip 4 surrounds the edge of the pedal, and the four fastening ends 10 lie against the edge of the pedal and project down below the same. The ends 10 are then bent inward by any suitable means, so as to tightly engage the under side of the pedal, thereby securely clamping the pad upon the pedal.

The pad being complete in itself, requires no separate securing means, and therefore there are no parts to work loose or become lost.

Having described my invention, what I claim as new and desire to secure by Letters Patent is:—

1. The combination with a pedal having a foot stop on one end thereof, of a pad for said pedal having a hollow projection to receive said foot stop and a metal member which is embedded in said pad during the vulcanizing process, having strips which project through the bottom of said pad and are adapted to be bent inward around the edge of said pedal and against its under side, to secure the pad to the pedal.

2. In a device of the character described, the combination with a pedal having an upwardly projecting foot stop on one end; of a rubber pad for said pedal, having an upwardly projecting hollow member on one end to receive said foot stop and a depending lip which surrounds the edge of said pedal, and a metal element embedded in said pad during the vulcanizing process, having portions which project through the under side of the pad and are adapted to be bent inward around the edge of the pedal and against its under side.

3. In a device of the character described, the combination with a pedal, of a rubber pad therefor having a metal element embedded therein during the vulcanizing process, said metal member comprising a longitudinal strip having a wing on each side, the end portions of said wings being bent down at right angles and extended through the bottom of said pad, said end portions being adapted to be bent inward around the edge of said pedal and against its under side to secure the pad to the pedal.

4. In a device of the character described, the combination with a pedal, of a rubber pad therefor having a metal fastener device embedded therein during the vulcanizing process, said fastener device comprising a longitudinal strip having transverse wings at its ends, portions of which are bent down at right angles to extend through the lower side of the pad, the center portion of said horizontal strip being depressed to be below the plane of the wings, the downwardly extended portions of said wings being adapted to be bent inward around the edge of said pedal and against its under side to secure the pad to the pedal.

5. In a device of the character described, the combination with a pedal having a foot stop on one end thereof; of a rubber pad for said pedal having a hollow projection to receive said foot stop and a depending lip which surrounds the edge of said pedal, said pad having a metal element embedded therein during the vulcanizing process, which is provided with depending portions which extend through and beyond said lip, said depending portions being adapted to be bent inward around the edge of the pedal and against its under side, to secure the pad to the pedal.

6. A pad of the character described, having a depending surrounding lip and a hollow upwardly extending lug at one end which opens through the bottom of the pad, and a metal longitudinal strip embedded in said pad during the vulcanizing process, having a wing at each end, portions of which are bent down at right angles to extend through and beyond said lip.

7. A rubber pad of the character described, having a metal element embedded therein during the vulcanizing process, which is provided with depending portions which extend through and beyond the bottom of the pad adjacent to the edges thereof.

In testimony whereof I affix my signature in presence of two witnesses.

FREDERICK C. GRANT.

Witnesses:
S. M. BERG,
ANNA VAVREK.